J. H. LETZ.
UNIVERSAL GRINDER.
APPLICATION FILED SEPT. 13, 1918.

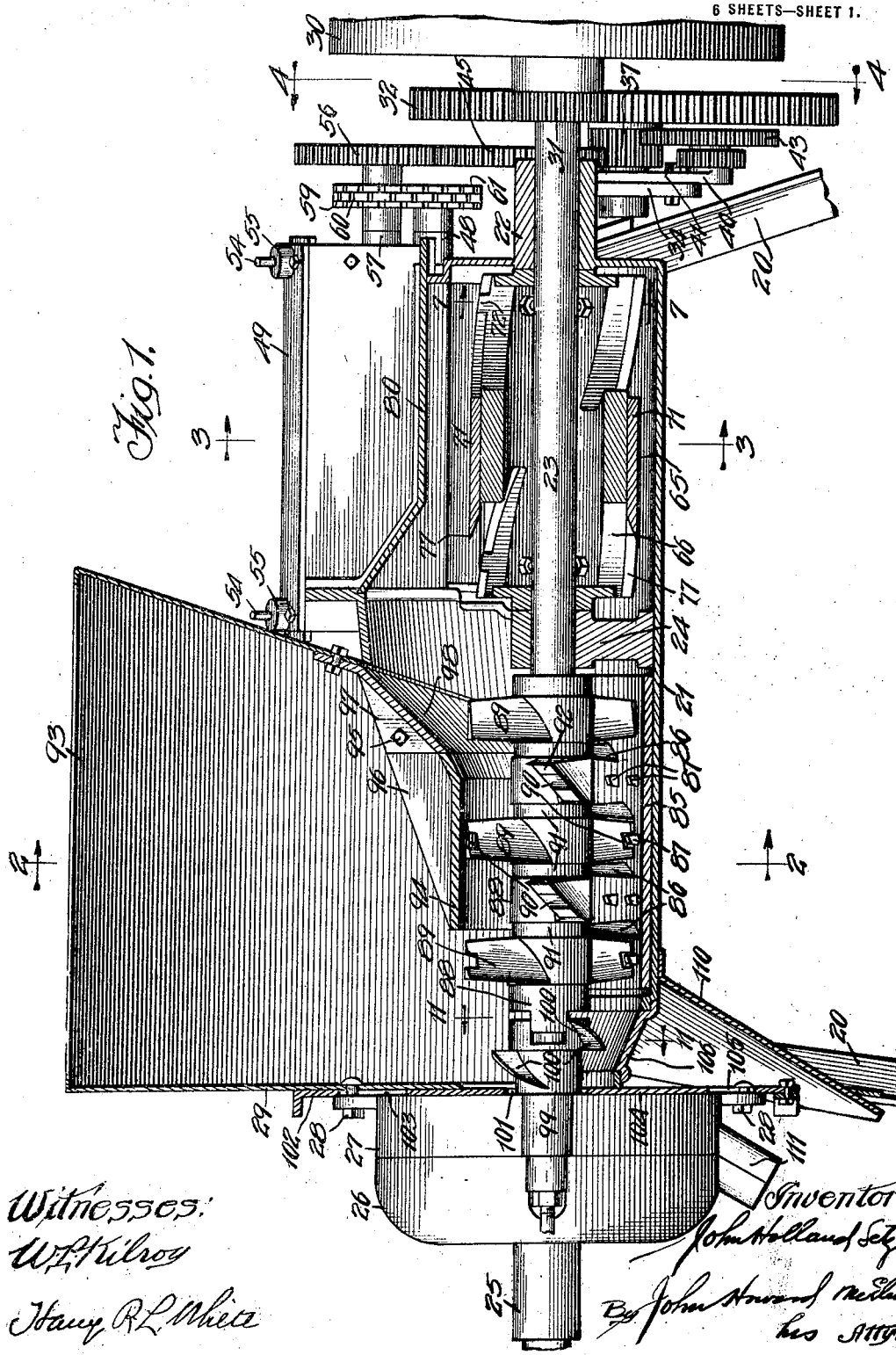

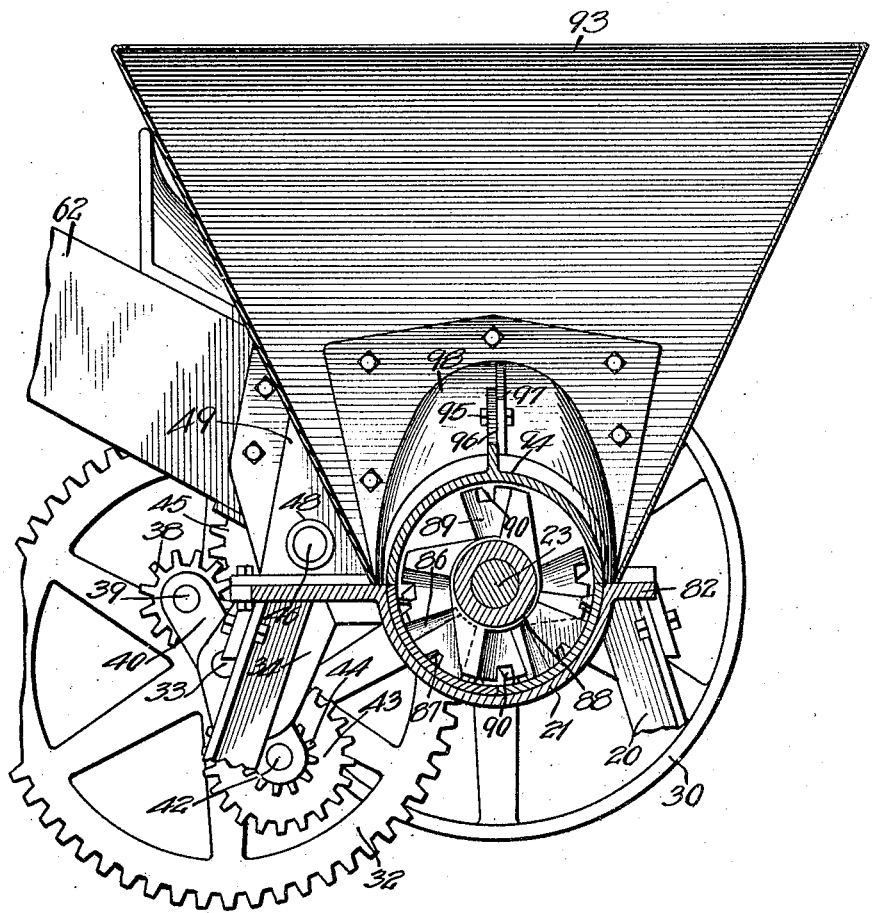
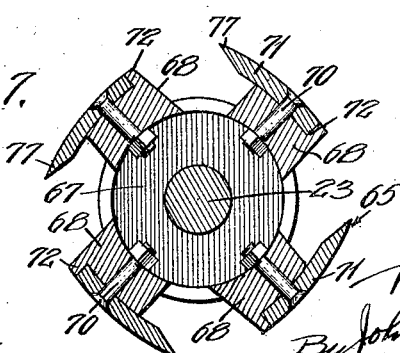

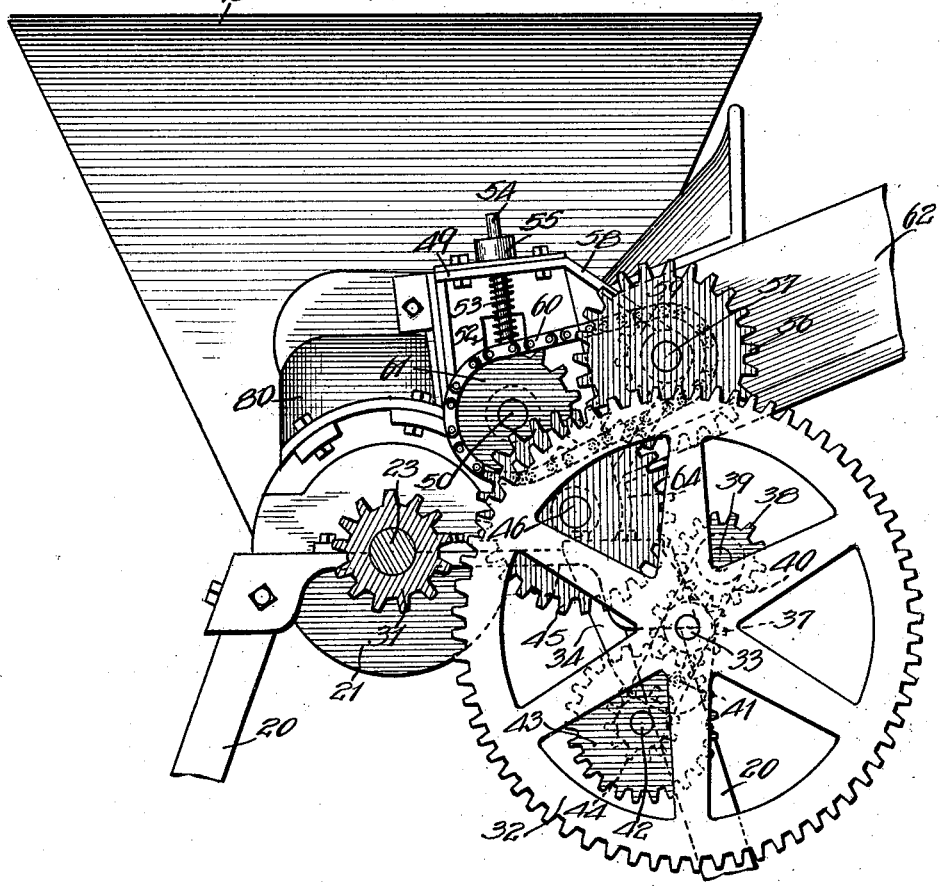
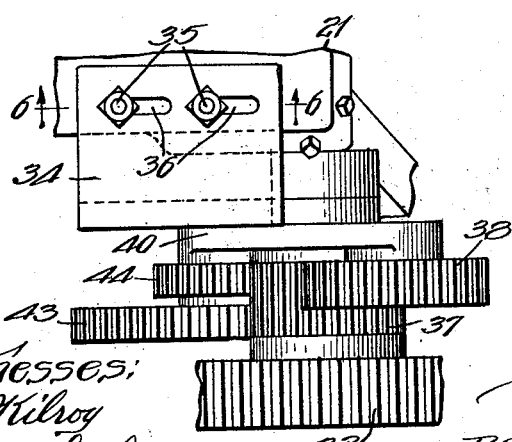
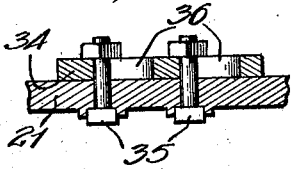

1,404,981.
Patented Jan. 31, 1922.

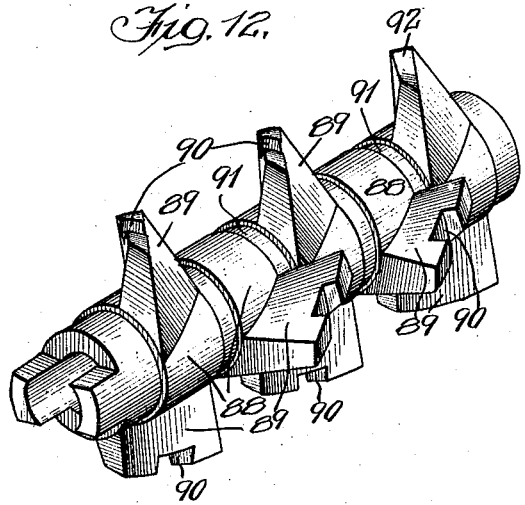
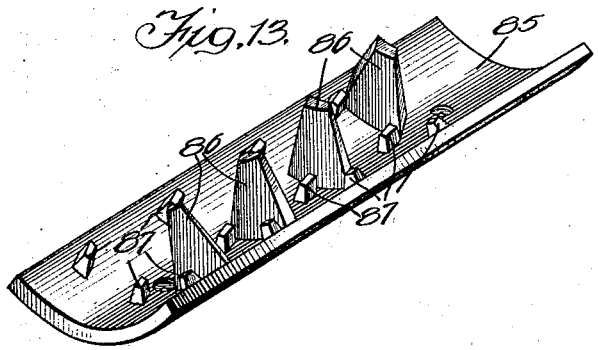
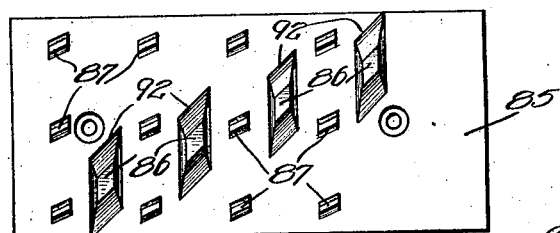

UNITED STATES PATENT OFFICE.

JOHN HOLLAND LETZ, OF CROWN POINT, INDIANA, ASSIGNOR TO THE LETZ MANUFACTURING COMPANY, OF CROWN POINT, INDIANA, A CORPORATION OF INDIANA.

UNIVERSAL GRINDER.

1,404,981. Specification of Letters Patent. Patented Jan. 31, 1922.

Application filed September 13, 1918. Serial No. 253,859.

*To all whom it may concern:*

Be it known that I, JOHN HOLLAND LETZ, a citizen of the United States, and a resident of Crown Point, in the county of Lake and State of Indiana, have invented certain new and useful Improvements in Universal Grinders, of which the following is a full, clear, and exact specification.

My invention is concerned with cutting and grinding mills, and is designed to produce such a mill as will be capable of cutting and grinding in an economical manner practically every material that the farmers of all sections desire to comminute. To this end it comprises in combination five main elements, to-wit, (1) feeding mechanism to feed materials needing preliminary cutting into (2) the cutting mechanism, which cuts them and feeds them into (3) the coarse grinding mechanism, with which is associated (4) a hopper which supplies directly such material as needs no preliminary cutting; and finally (5) a fine grinding mill into which the coarse ground material is fed if it is to be ground fine. Associated with the main elements, I preferably provide (6) gearing for the feeding mechanism, which gearing may be thrown out of action where the materials do not require cutting and are to be supplied directly from the hopper, as well as (7) a removable bottom for the hopper which, when in place, cuts out from actual operation on the materials substantially all of the rough grinding mechanism when the materials to be ground need only the action of the fine grinding mill. I also preferably provide (8) an auxiliary discharge aperture between the coarse grinding mechanism and the fine grinding mill through which coarse ground materials can be discharged without reaching the fine grinding mill in case they are not to be ground fine.

My invention is also concerned with certain novel elements, constructions and combinations, all of which will be described at length in the body of the specification and particularly pointed out in the claims.

To illustrate my invention, I annex hereto six sheets of drawings in which the same reference characters are used to designate identical parts in all the figures of which—

Fig. 1 is a central longitudinal section through the mill, the fine grinding portion of which being shown in elevation, the section being on the line 1—1 of Fig. 3;

Fig. 2 is a transverse vertical section on the line 2—2 of Fig. 1;

Fig. 4 is an end view, partly in section on the line 4—4 of Fig. 1, but showing the gearing for the feeding mechanism thrown out of operation;

Fig. 5 is a top plan view of part of the mechanism shown in Fig. 4 but on a larger scale;

Figure 9:
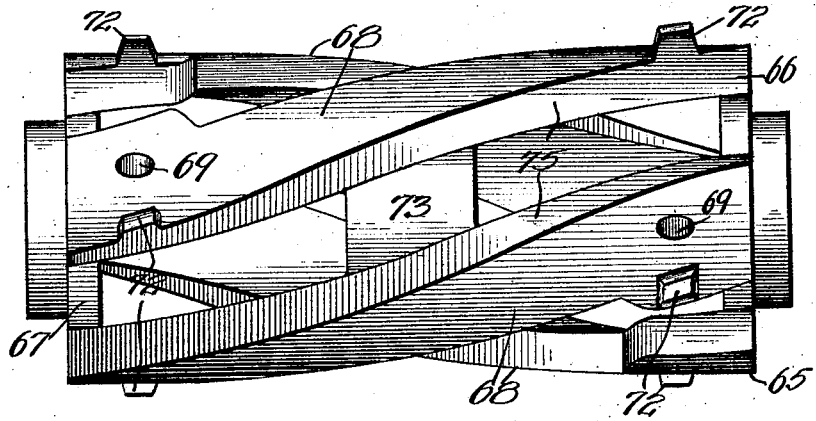
Figure 10:
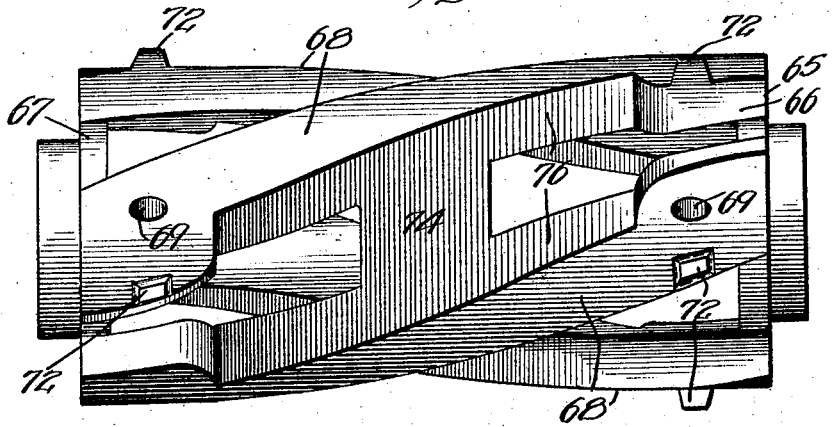
Figure 11:
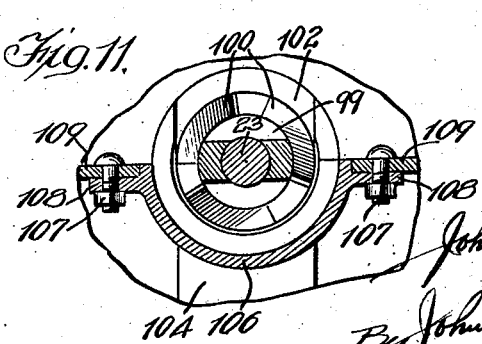

Fig. 7, Sheet 2, is a detail through the cutter head in section on the line 7—7 of Fig. 1;

Fig. 8, Sheet 3, is a side elevation of the cutter head detached;

Fig. 9 is a top plan view of the casting for the cutter head, seen in a certain position;

Fig. 10 is a similar view of the same casting seen from position at right angles to the position of Fig. 9;

Fig. 11 is a detail in vertical section on the line 11—11 of Fig. 1;

Fig. 12 is a perspective view of the cylinder of the coarse grinding mill;

Fig. 13 is a similar view of the concave of the said coarse grinding mill; and

Fig. 14 is a top plan view of said concave.

Figure 3:
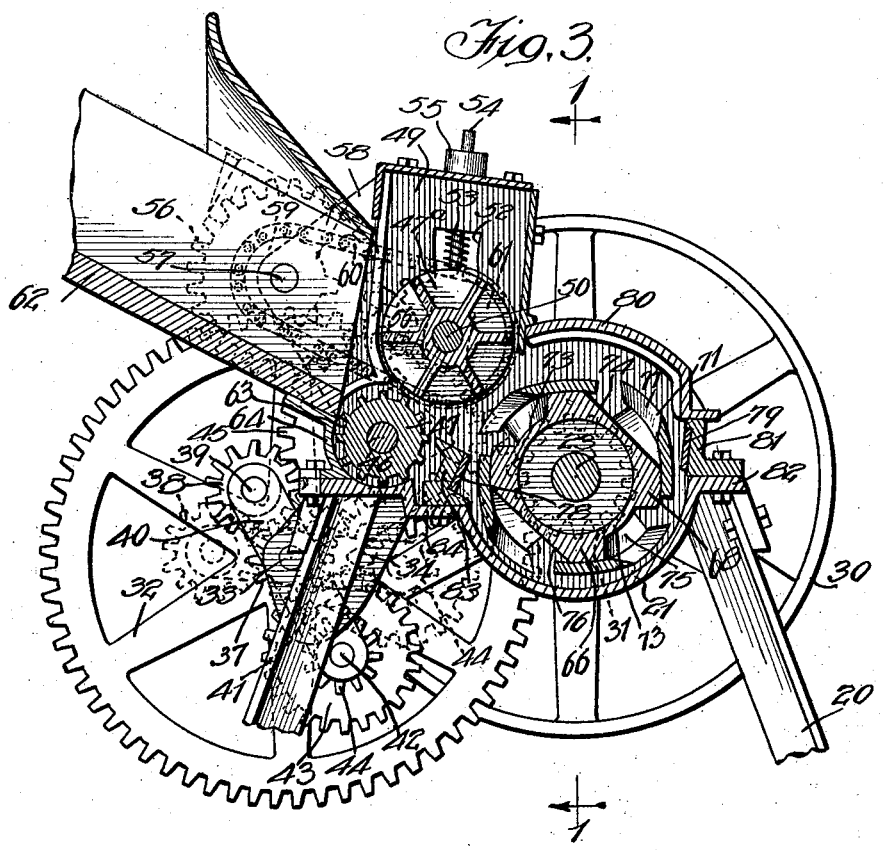
Fig. 3 is a similar section on the line 3—3 of Fig. 1.
Figure 6:
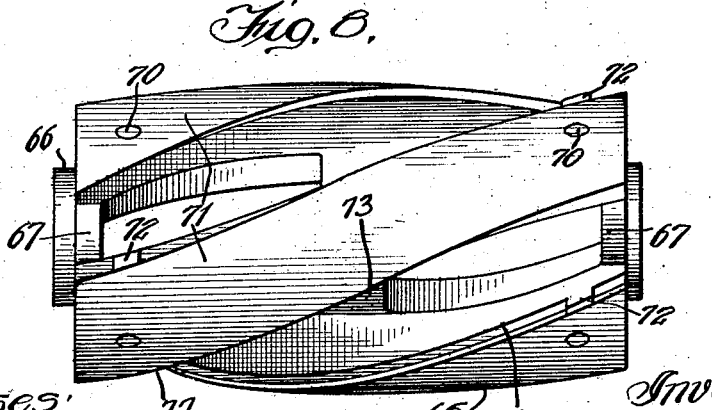
Fig. 6 is a vertical section on the line 6—6 of Fig. 5.

In carrying out my invention I provide the customary frame work, which preferably consists of four legs 20 bolted or otherwise secured to the four corners of the concave casting 21, which has the general shape of a shallow concave extending substantially the length of the machine. At the driving end of the machine is the bearing 22 formed on the end of the concave casting for that end of the main shaft 23, which extends throughout the length of the machine and is journaled in the bearing above noted, the central bearing 24, secured to the bottom of the concave 21 and the bearing 25 at the discharge end of the machine, which bearing forms a part of the outer casing section 26 for the fine grinding mill, said section 26 and the inner section 27, being secured to the concave casting in any desired manner, as in the manner illustrated in my Patent, No. 1,223,497, dated April 24, 1917, for instance. The shaft 23 has secured thereon the belt pulley 30 to which power is applied and the hub of this pulley has secured thereon the spur-gear pinion 31 which, when the feed mechanism is in use, meshes with the large spur-gear wheel 32 journaled on the bearing stud 33 projecting outwardly from the vertical flange of the bracket casting 34, which casting 34 is bolted, as best seen in Figs. 5 and 6 to the adjacent end of the concave casting 21 by the bolts 35 passed through the elongated slots 36 formed in the horizontal flange of the bracket 34 so that when the feed gearing is to be thrown out of operation, as seen in Fig. 4, it can be done by loosening the nuts on the bolts 35 and pulling the bracket outward. The hub of the large spur-gear wheel 32 has secured thereon the spur-gear pinion 37 which meshes with a spur-gear wheel 38 journaled on a stud 39 projecting outwardly from the upper end of a bracket 40, which can be secured in either of two positions of adjustment by the bolt 41 passing through said bracket 40 and through a slot in the vertical flange of the bracket casting 34. On the lower end of bracket 40 is a stud 42, which has journaled on the outer end thereof the larger spur-gear wheel 43 meshing with the spur-gear pinion 37 and having secured thereon the similar spur-gear pinion 44 which is in the same vertical plane as the pinion 38. These pinions 38 and 44 are in the same vertical plane as the spur-gear wheel 45 secured on the outer end of the shaft 46 of the lower feed roll 47 the shaft of which feed roll is journaled in suitable bearings 48 formed in the sides of the feed roller casing 49. The feed roller 47 has a longitudinally corrugated periphery and co-operates with a feed roller 47ª of larger diameter mounted on the shaft 50 which is journaled in vertically movable bearings 51, adapted to slide in the vertical ways 52 formed in the end walls of the casing 49 for the feed rolls. The feed roll 47ª is of a peculiar design, being of considerably greater diameter than the feed roll 47 and having the deep longitudinal pockets formed therein adapted to receive ears of corn and feed them between the feed rolls without forcing said rolls apart an unnecessary distance against the resistance of the helically coiled expanding springs 53 which surround the substantially vertical extending rods 54 connected at their lower ends to the bearings 51 and having their upper ends extending upward through apertures formed in the bosses 55 on the top of the feed roll casing 49. The springs 53 are held under tension by their engagement with the under side of the bosses 55 and serve to press the feed rolls yieldingly in engagement. The feed roll 47ª is driven at the same peripheral velocity as the feed roll 47 by means of the spur-gear wheel 56 meshing with the spur-gear wheel 45 and journaled on the stud shaft 57 projecting from the bracket extension 58 of the adjacent end wall of the feed roll casing 49. A sprocket pinion 59 secured on the hub of the spur-gear wheel 56 has the sprocket chain 60 thereon co-operating with the sprocket wheel 61 secured on the outer end of the shaft 50 of the feed roll 49, the sprocket wheel 61 being sufficiently larger than the sprocket pinion 59 to keep the peripheral velocities of the two feed rollers substantially the same.

Secured on the receiving side of the feed roll casing 49 is the feed trough 62 and the feed roller 47 co-operates on its under half with a semi-circular recess 63 formed in the casting 64 closing the lower end of the feed roll casing 49 and in the adjacent portion of the concave casting 21 so as to prevent materials being fed back to meet the feed roll 47.

The cutter head 65 is of a novel construction, and having a novel location on the same shaft 23 as the coarse grinding mechanism, it has to have the double function of cutting up the material and after it is cut of feeding it longitudinally of said cutter head by a screw action to said coarse grinding mechanism. To this end, it is constructed of a casting and a set of blades, the casting 66, as best seen in Figs. 1, 3, 7, 9 and 10 having a pair of heads 67 adapted to be secured on the shaft 23 in any customary manner and connected by a plurality, in the present case four, helically extending ribs 68 the shape of which in cross-section immediately adjacent the head 67 is shown in Fig. 7. At this section they are provided at each end with the apertures 69 for the bolts 70 by which the helical blades 71 are bolted in place and also with the abutment lugs 72 by which the backs of the blades 71 are engaged. The ribs 68 are connected at their centers by short webs 73 and 74, the webs 73 connecting the adjacent edges 75 of the ribs that are not cut off, while the webs 74 connect the edges 76 of the ribs that are flattened off in their central portions, the novel shape being employed to produce a casting that can be readily molded. The outer faces of the ribs 68 are helical portions of a cylindrical surface, and the blades 71 are flat bars with ground edges curved to a helical shape so that the cutting edges 77 will extend a little outside of the generally cylindrical surface of the cutter head and co-operate closely with the edges of the plain cutter bars 78 and 79 secured on the front and rear of the cutter head casing which has its bottom made up of the adjacent portion of the concave casting 21, and its top formed by a curved casting 80, the top edge of which engages the rear of the feed roll casing 49, while its lower edge is seated on the casting 81 L-shaped in vertical cross-section, bolted to the adjacent horizontal flange 82 of the concave casting 21, while the cutter bar 79 is secured to its inner face, the parts going to make up the cutter head casing being bolted together in any convenient manner. The cutter bar 78 is secured on the bar 83, which is generally Z-shaped in its vertical cross-section, and is bolted on the horizontal ledge 84 of the concave casting 21. Its top flange extends back to the feed roll 47 and directs the material fed to the cutter head.

From the description thus given of the cutter head and its associated elements, it will be evident that material fed thereto by the feed rolls 47 and 47ª will be chopped by the blades 71 co-operating with the cutter bars 78 and 79 and that the helical pitch of the ribs 68 and the blades 71 will serve to feed the material as fast as it is cut along the axis of the shaft 23 to the coarse grinding concave and cylinder. If the material is to be fed to the cutter head rapidly, the bracket 40 is to be adjusted as shown in full lines in Fig. 3 with the pinion 46 in mesh with the spur-gear wheel 45. If the feed is to be slow it will be adjusted as seen in dotted lines in Fig. 3 with the pinion 44 in mesh with the spur-gear wheel 45.

The coarse grinding elements of my invention are the concave 85, seen in Figs. 13 and 14 secured near the discharge end of the concave casting 21 and bolted therein, and provided, as seen, with four long teeth 86, alternated with the rows of fine teeth 87, co-operating with the cylinder, preferably made up of five similar sections, each consisting of a hub 88 and a pair of opposed teeth 89, all but the last pair of teeth being provided with the recesses 90 in their tips to co-operate with the short teeth 87 of the concave, the teeth 87 being cleared by reason of the recesses 90. The sections may be formed integrally, or separately and locked together on the shaft 23 by recesses in their ends. As shown the teeth are set with their feeding faces in a helical plane, so as to feed the material through the coarse grinding section, and between each pair of hubs 88 is an annular groove 91, adapted to receive the tips of the long teeth 86 on the concave, which teeth are also set in the concave and have their faces 92 also arranged in the lines of helical spires to assist in the feeding of the material lengthwise of the shaft 23. The sides of the teeth 89 shear with the sides of the long teeth 86, and as a consequence the coarse grinding is done as rapidly as the material can be fed thereto by the cutter head.

Where the material does not need to be cut, it is placed directly in the hopper 93 supported on the edges of the concave casting 21 above the concave 85. Where much material is to be ground without preliminary cutting, the bolts 35 are loosened and the casting bracket 34 adjusted, as seen in Fig. 4, to move all of the feeding gearing out of mesh and thus avoid the use of unnecessary power and wear and tear on the machine when the operation of the feeding mechanism is not needed.

For grinding some materials, already fairly fine, the action of all the teeth 89 is not needed, in which case the shield 94 is bolted in place by the bolt 95 passed through the rear end of the vertical flange 96 and the flange 97 projecting up from the center of the casting 98 forming a part of the bottom of the hopper, and secured to one end thereof.

The hub 88 of the last section is connected by a set of clutch teeth with a small screw member 99 having a plurality of helically directed wings 100 projecting therefrom so as to feed the coarse ground material through the receiving aperture 101 of the buhr casing 26, 27, the size of the aperture being regulated on the upper side by the feed plate 102 having the vertical slot 103 therein through which the bolt 28 passes. Similarly, there is provided on the lower side a similar plate 104 having the vertical slot 105 therein through which passes the lower bolt 28. The shaft 23 has secured thereon inside the buhr casing any desired form of a rotating buhr co-operating with a companion stationary buhr for fine grinding, these buhrs being of any desired construction for that purpose and not needing specific illustration. If desired, they may be such buhrs as are illustrated in my Patents No. 1,244,513, No. 1,244,514, No. 1,244,515, No. 1,244,516 and No. 1,244,517, dated October 30, 1917.

Where the materials do not need to be ground fine, I remove the bottom section 106 by removing the bolts 107, seen in Fig. 11, which pass through the ears 108 of said section, and the flanges 109 on the concave casting 21. The coarsely ground material then falls through the aperture left in the end of the concave, and is discharged by the spout 110 instead of passing into the buhr casing, being there fine ground, and thence discharged through the spout 111 of the buhr casing.

It will of course be understood that the machine is supplied with various assortments of grinding plates or buhrs for different materials, such for instance as illustrated in my patents above mentioned, and by changing the buhrs for different materials, employing the different speeds of the feeding mechanism, or dispensing with it entirely, and different portions of the coarse grinding apparatus I am enabled with the single machine to grind any kind of material the farmer has occasion to grind to any desired degree of fineness, and without the use of unnecessary power, thus producing what may be truly called a universal grinder.

While I have shown and described my invention as embodied in the form which I at present consider best adapted to carry out its purposes, it will be understood that it is capable of modifications and that I do not desire to be limited in the interpretation of the following claims except as may be necessitated by the state of the prior art.

What I claim as new and desire to secure by Letters Patent of the United States is:

1. A cutter head casting consisting of a pair of heads and four helically shaped parallel supporting bars connecting said heads at their peripheries, the adjacent edges of the bars on two sides being flattened as shown throughout the central portion of their length, for the purpose described.

2. In a grinding machine, the combination with a casing, of a shaft rotating therein, hubs secured on the shaft having teeth with recesses in their ends projecting radially therefrom but having their advancing front surfaces set at an angle to the axis of the shaft so as to form a helical feed, a concave concentric with the shaft and having long stationary teeth projecting therefrom toward and substantially to the peripheries of the hubs and shearing with the sides of the rotating teeth alternated with series of short teeth co-operating with the recesses in the ends of the rotating teeth, and means for rotating the shaft.

3. In a grinding machine, the combination with a main casing having a shaft extending therethrough, of a buhr casing with a discharge aperture at one end of the main casing, a concave beneath said shaft, grinding means carried by the shaft and co-operating with the concave, fine grinding buhrs in the buhr casing, a discharge aperture from the main casing to the buhr casing, an aperture in the main casing below the discharge aperture to the buhr casing, and means for closing said last mentioned aperture when material is to be ground fine.

4. In a grinding machine, the combination with a casing having a concave therein, of a hopper opening into the casing over the concave, a shaft journaled in the concave having a plurality of sets of grinding teeth disposed longitudinally of the shaft and co-operating with the concave, and a removable bottom section for the hopper which when in place covers some of the sets of grinding teeth and prevents their acting on the material to be ground and if removed or put in place regulates the rapidity of the grinding.

5. In a grinding and cutting machine, the combination with a casing, of a shaft journaled in and extending through the casing, a concave toward one end of the shaft, a hopper above said concave discharging thereinto only, grinding elements secured on the shaft above the concave and beneath the hopper, a cutter head on the shaft toward the other end and beyond the hopper, a cutter head casing forming a part of the main casing and discharging at one end upon the concave, a supply aperture for the cutter head casing, and mechanism for feeding materials through said aperture to the cutter head only.

6. In a grinding and cutting machine, the combination with a casing, of a shaft journaled in and extending through the casing, a concave toward one end of the shaft, a hopper above said concave discharging thereinto only, grinding elements secured on the shaft above the concave and beneath the hopper, a cutter head on the shaft toward the other end and beyond the hopper, a cutter head casing forming a part of the main casing and discharging at one end upon the concave, a supply aperture for the cutter head casing, mechanism for feeding materials through said aperture to the cutter head only, gearing connected to the shaft for driving the feeding mechanism, and means for disengaging the gearing from said shaft when the feeding mechanism is to be thrown out of operation.

In witness whereof, I have hereunto set my hand and affixed my seal, this 29th day of August, A. D. 1918.

JOHN HOLLAND LETZ. [L. S.]

Witness:
JOHN HOWARD McELROY.